(12) United States Patent
Sone et al.

(10) Patent No.: US 10,844,889 B2
(45) Date of Patent: Nov. 24, 2020

(54) SUPPORT MEMBER

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Kosuke Sone, Mie (JP); Kazuyoshi Ohara, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 281 days.

(21) Appl. No.: 16/084,443

(22) PCT Filed: Feb. 21, 2017

(86) PCT No.: PCT/JP2017/006320
§ 371 (c)(1),
(2) Date: Sep. 12, 2018

(87) PCT Pub. No.: WO2017/159232
PCT Pub. Date: Sep. 21, 2017

(65) Prior Publication Data
US 2019/0078597 A1 Mar. 14, 2019

(30) Foreign Application Priority Data
Mar. 14, 2016 (JP) .................... 2016-049199

(51) Int. Cl.
*F16L 3/00* (2006.01)
*F16B 4/00* (2006.01)
(Continued)

(52) U.S. Cl.
CPC ............ *F16B 4/004* (2013.01); *F16B 5/0024* (2013.01); *F16B 5/0084* (2013.01); *H02G 3/30* (2013.01); *F16B 5/02* (2013.01)

(58) Field of Classification Search
CPC ...... F16B 4/004; F16B 5/0024; F16B 5/0084; H02G 3/30
(Continued)

(56) References Cited

U.S. PATENT DOCUMENTS 10,457,227 B2 * 10/2019 Sone ...................... H01R 13/56
2007/0086827 A1 * 4/2007 Sawai .................... B65H 5/062
400/634

(Continued)

FOREIGN PATENT DOCUMENTS

| JP | S62-014919 A | 1/1987 |
| JP | 2003-102116 A | 4/2003 |
| JP | 2014-220866 A | 11/2014 |

OTHER PUBLICATIONS

International Search Report in International Application No. PCT/JP2017/006320 dated May 9, 2017.
(Continued)

*Primary Examiner* — Todd M Epps
(74) *Attorney, Agent, or Firm* — Honigman LLP

(57) ABSTRACT

The present disclosure reduces the manufacturing costs of a support member with a portion made from resin that supports a conductive member. The support member is equipped with: a resin main body portion that has a support surface for supporting a conductive member such as an electric wire; and a metal plate that has a through-hole for a bolt and is for attachment to a device. The main body portion has a receptacle portion into which the plate is press-fitted and fixed.

15 Claims, 9 Drawing Sheets

(51) Int. Cl.
  *H02G 3/30*  (2006.01)
  *F16B 5/00*  (2006.01)
  *F16B 5/02*  (2006.01)

(58) Field of Classification Search
  USPC ............... 248/65, 73, 205.1, 220.21, 309.1;
        403/345; 439/464, 465, 459; 172/72 A
  See application file for complete search history.

(56) References Cited

U.S. PATENT DOCUMENTS

2013/0134336 A1\* 5/2013 Lin .................... F16K 31/04
                                                   251/129.12
2013/0307291 A1\* 11/2013 Suzuki ................. B60J 5/06
                                                   296/209

OTHER PUBLICATIONS

Written Opinion in International Application No. PCT/JP2017/006320 dated May 9, 2017.

\* cited by examiner

# SUPPORT MEMBER

CROSS-REFERENCE TO RELATED APPLICATIONS

This application is the U.S. national stage of PCT/JP2017/006320 filed Feb. 21, 2017, which claims priority of Japanese Patent Application No. JP 2016-049199 filed Mar. 14, 2016.

TECHNICAL FIELD

The present disclosure relates to a support member that supports conductive members such as electric wires.

BACKGROUND ART

JP 2014-199071A discloses a holding plate that is made of metal and is installed into an automatic transmission to support electric wires. The holding plate has bolt insertion holes with circular openings for bolts, and is attached to the automatic transmission via the bolts inserted into the insertion holes.

In consideration of such aspects as weight reduction, processability, and the improvement of the ease of assembly with electric wires, holding plates are sometimes required to be made from resin. In view of this, for example, a configuration is conceivable in which a metal collar is integrated with the holding plate through insert molding, and bolts are fastened to the metal collar. However, the cutting and insertion molding of metal collars has a problem of causing manufacturing costs to increase.

The present disclosure was achieved based on the above-described circumstances, and an object thereof is to reduce the manufacturing cost of a support member in which the portion for holding a conductive member is made of a resin.

SUMMARY

A support member of the present disclosure includes: a main body portion that is made of a resin and has a support surface that supports a conductive member; and a plate that is made of a metal, has a through-hole, and is to be attached to a device, wherein the main body portion has a receptacle portion into which the plate is press fitted and fixed.

According to the aforementioned configuration, the resin main body portion that supports a conductive member is attached to the device via the metal plate. The plate is easily molded through press processing or the like, and moreover, need only be press fitted into the receptacle portion of the main body portion. For this reason, manufacturing cost can be reduced.

DETAILED DESCRIPTION OF PREFERRED EMBODIMENTS

Figure 1:
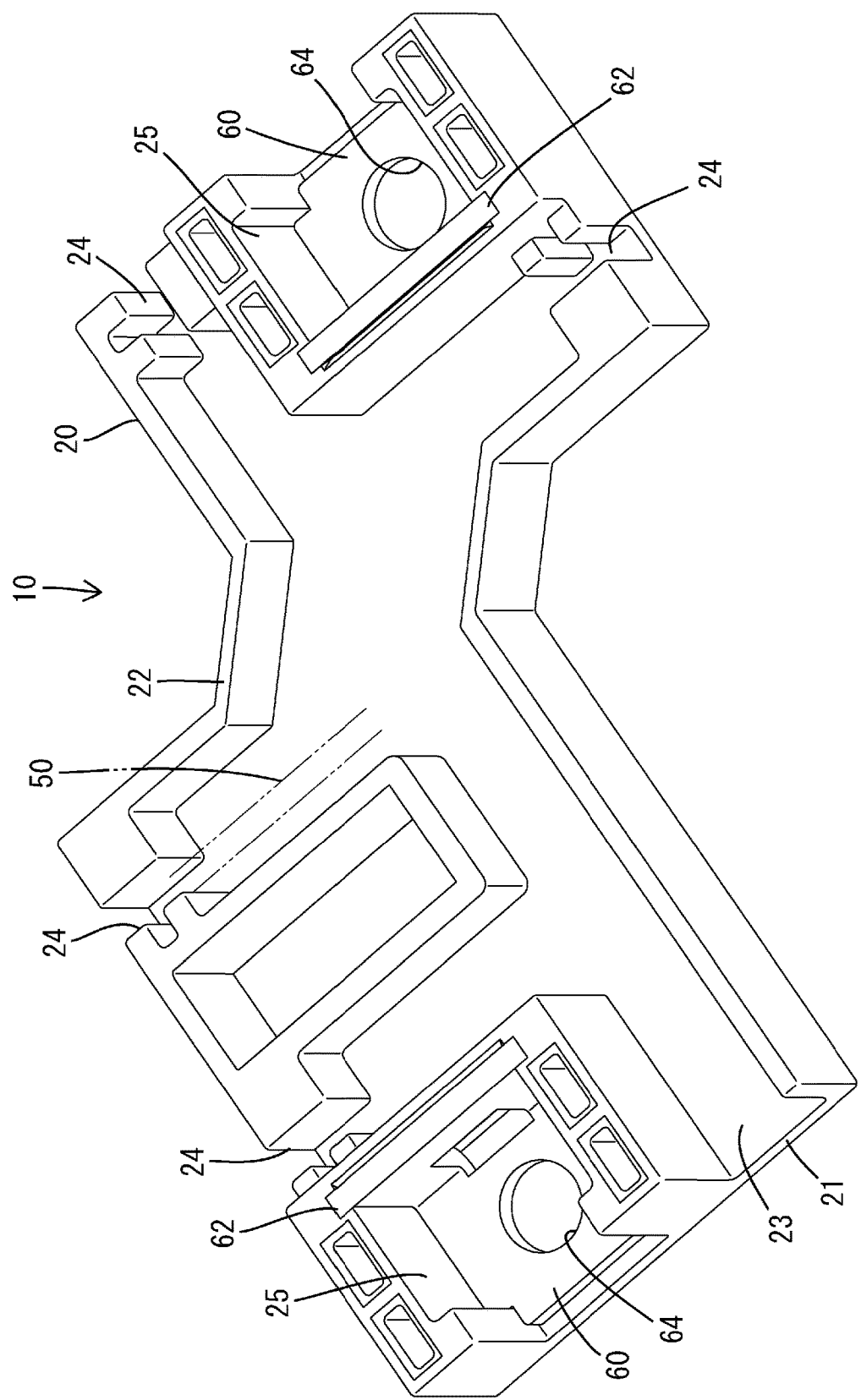
FIG. 1 is a perspective view of a support member of a first embodiment of the present disclosure.
Figure 2:
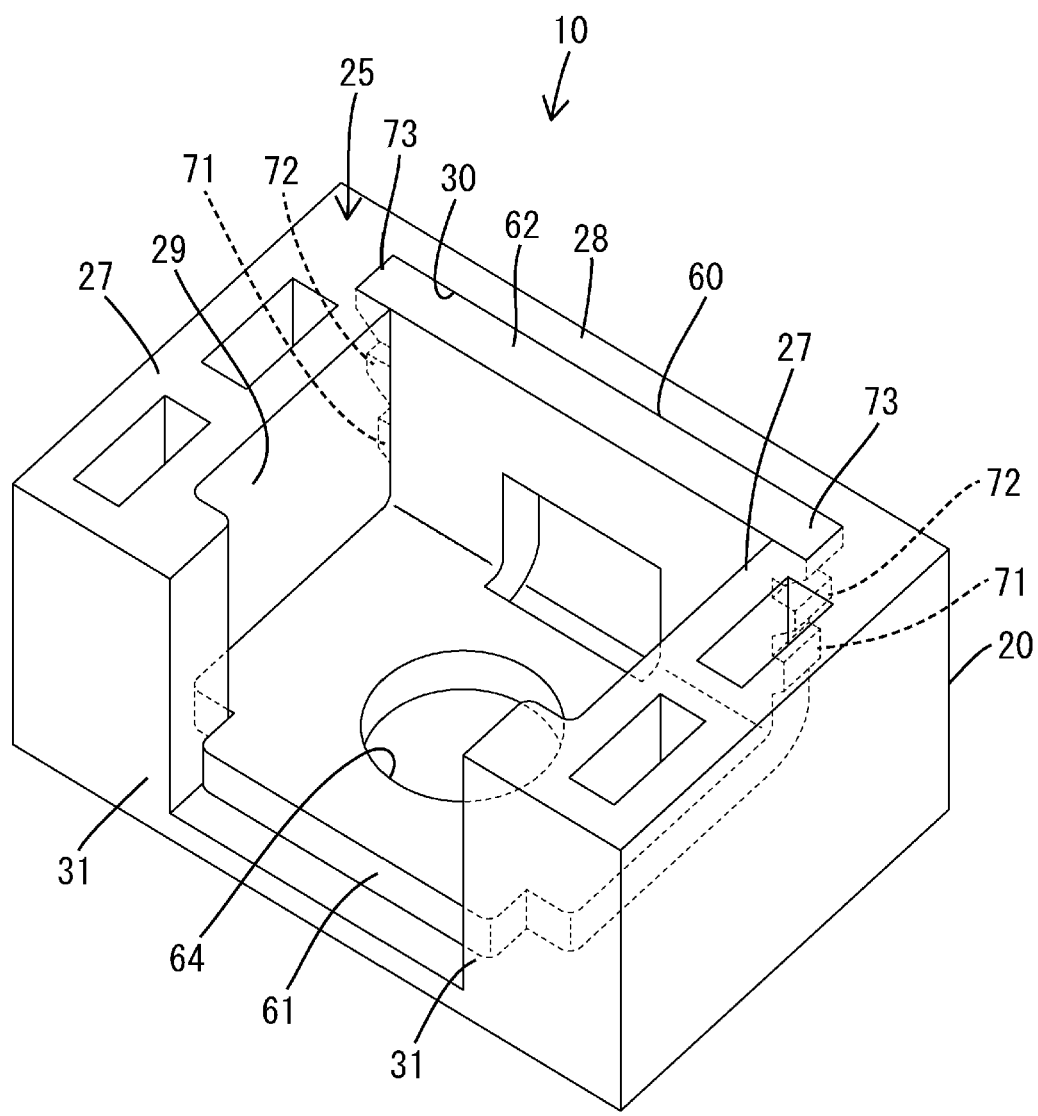
FIG. 2 is a perspective view of a portion in which a plate is press-fitted into a receptacle portion.

The following describes preferred embodiments of the present disclosure.

A configuration is possible in which the plate has a protrusion on a side end portion, and the receptacle portion has a wall surface extending along a direction that intersects a planar direction of the support surface, and has a configuration in which a side end portion of the plate is positioned along the wall surface, and the protrusion digs into and is locked to the wall surface According to this configuration, the plate is able to be press fitted into the receptacle portion from a direction that intersects with the planar direction of the support surface of the main body portion, and thus the press fitting work of the plate is able to be carried out smoothly.

A configuration is possible in which the plate has a press fit portion that has the protrusion, and a fixing portion that has the through-hole and bends from and is continuous with the press fit portion, and the receptacle portion has an opening that comes into communication with the through-hole and allows the fixing portion to face the device. When the press fit portion is press fitted into the receptacle portion, the fixing portion can face the device via the opening, and thus it is possible to quickly attach the plate to the device via a bolt that is inserted through the through-hole of the fixing portion.

A configuration is possible in which the plate has a plurality of protrusions on a side end portion arranged side-by-side in a press fitting direction with respect to the receptacle portion, the receptacle portion has a wall surface that the protrusions dig into and are locked to, and the plurality of protrusions are configured to protrude a larger amount successively from a protrusion forward in the press fitting direction to a protrusion rearward in the press fitting direction. When the protrusions dig into and are locked to the wall surface of the receptacle portion, the protrusions scrape against the wall surface of the receptacle portion and produce shavings, which can lead to shavings mixing with a fluid or the like inside the device. In that respect, as described above, if the configuration is one in which the protrusions successively protrude a larger amount the farther the protrusions are rearward in the press fitting direction, even if shavings are produced due to the wall surface of the receptacle portion being scraped by a protrusion, the produced shavings will be effectively caught in a groove that is formed between that protrusion and the protrusion adjacent thereto rearward in the press fitting direction, and thus it is possible to avoid the undesirable situation of shavings being mixed with a fluid or the like inside the device.

A configuration is possible in which the plate has a protrusion on a side end portion, and the receptacle portion has a wall surface that the protrusion digs into and is locked to, and has an enclosing portion that covers the side end portion of the plate with the wall surface positioned on a deep side. According to this configuration, even if the protrusion scrapes the wall surface of the receptacle portions and produces shavings, the produced shavings can be caught inside the enclosing portion, and thus it is possible to avoid the undesirable situation of shavings mixing with a fluid or the like inside the device.

A configuration is possible in which the main body portion has an elastic locking portion having elasticity that restricts withdrawal of the plate from the receptacle portion. According to this configuration, withdrawal of the plate from the receptacle portion is prevented in a dual manner by the locking effect of the elastic locking portion and the press-fitting effect of the plate itself.

First Embodiment

The following describes a first embodiment of the present disclosure with reference to FIGS. 1 to 6. A support member 10 of the first embodiment is for installation in a hydraulic control device 90 of the automatic transmission of an automobile, and includes a synthetic resin-made main body portion 20 and a metal plate 60 that is fixed to the main body portion 20. Furthermore, the vertical direction in the following description is based on the state of the present disclosure being installed in an automobile.

As shown in FIG. 1, the main body portion 20 has a flat plate-shaped bottom wall 21 and a peripheral wall 22 that stands upright along the outer peripheral edge of the bottom wall 21. The portion of the upper surface of the bottom wall 21, not including a receptacle portion 25 which will be discussed below, forms a flat support surface 23 that supports electric wires 50 as the conductive member. The outer peripheral portion of the main body portion 20 has extraction portions 24 in notch form in the peripheral wall 22 at appropriate points spaced around the periphery. Electric wires 50 are extracted from the support surface 23 to the outside through the extraction portions 24 of the main body portion 20, and the leading portions are connected to a connector that is not shown.

Figure 3:
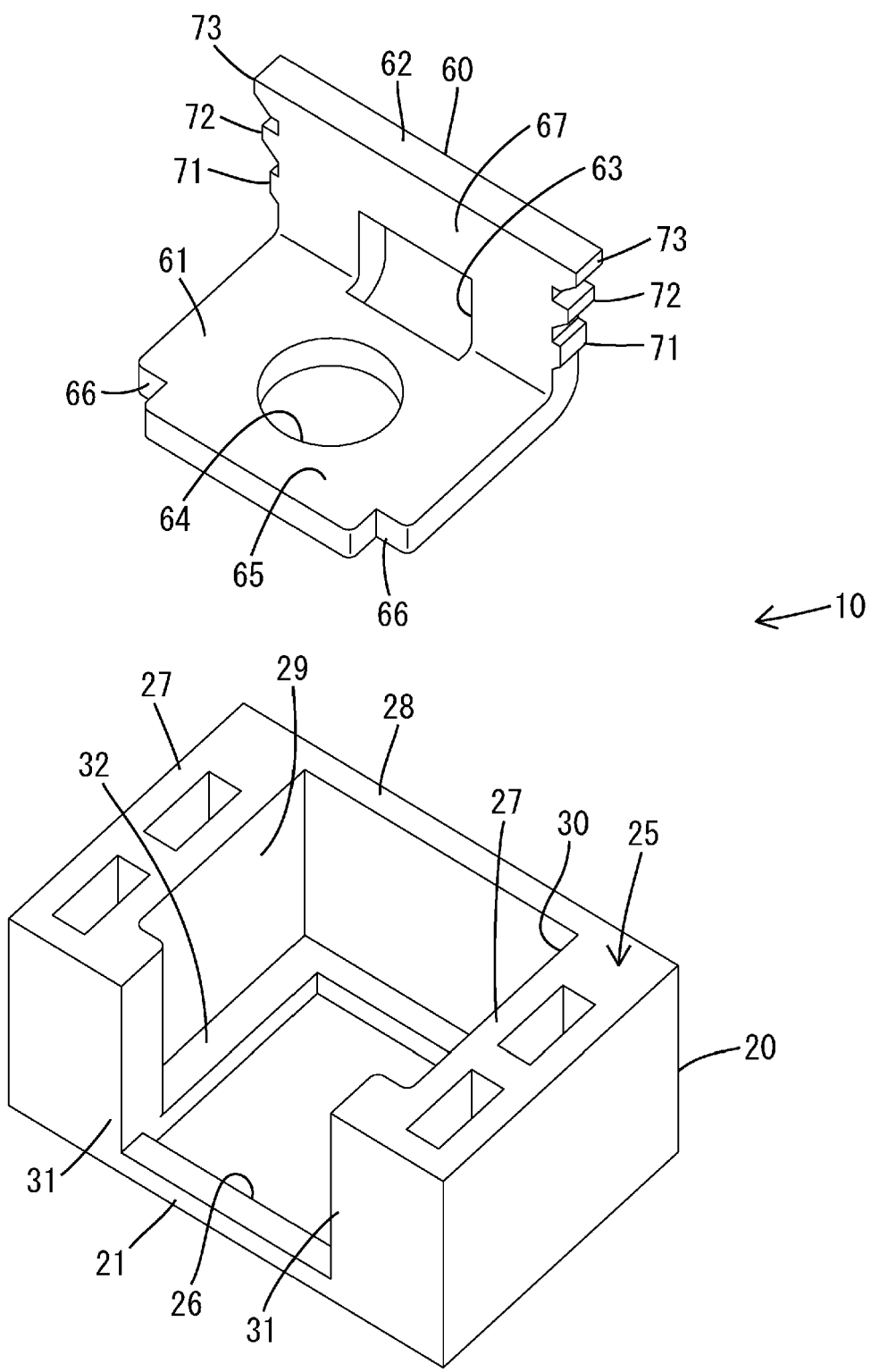
FIG. 3 is a perspective view of the plate and the receptacle portion in a separated state.

Also, the outer peripheral portion of the main body unit 20 has a receptacle portion 25 installed at appropriate points at intervals along the periphery and adjacent to the extraction points 24. As shown in FIG. 3, the receptacle portion 25 has an approximately rectangular opening 26 that passes through the bottom wall 21, and a back wall 28 and a pair of left and right side walls 27 that rise up from the periphery of the opening 26 that is in the upper surface of the bottom wall 21. The two side walls 27 are positioned facing each other on the left and right sides across the opening 26, and the opposing surfaces form wall surfaces 29 that rise vertically (the direction that intersects the planar direction of the support surface 23). The back wall 28 is continuous with and substantially orthogonal to the deep end portions of the two side walls 27. The back wall 28 and the two side walls 27 are positioned as to surround three sides of the opening 26 from a planar view, and defines a press fitting space 30 that is open vertically. The plate 60 is press fitted from above into the press fitting space 30 of the receptacle portion 25.

Also, the receptacle portion 25 has a pair of left and right end walls 31 that protrude a small amount in the direction of approaching each other and substantially orthogonally to the leading ends of the two side walls 27 (the ends on the side that is opposite to the side connected to the back wall 28). The two side walls 31 are arranged in a position facing the left and right ends of the back wall 28. The press fitting space 30 is also open between the two side walls 31. Also, on the upper surface of the bottom wall 21 of the receptacle portion 25, there is a flat mounting face 32 that is closed by the two walls 31, and positioned to surround the three sides of the opening 26.

Figure 6:
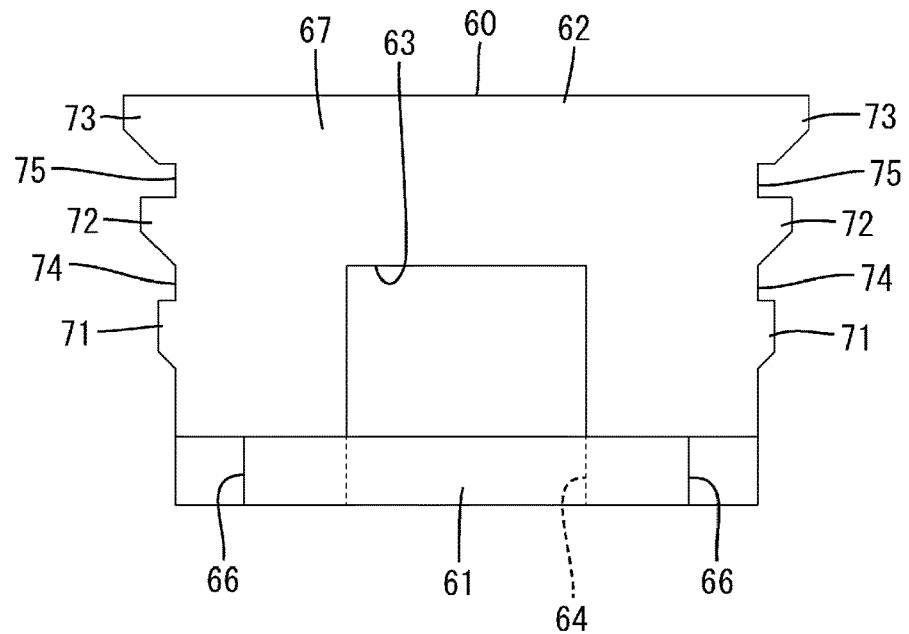
FIG. 6 is a front view of the plate.
Figure 7:
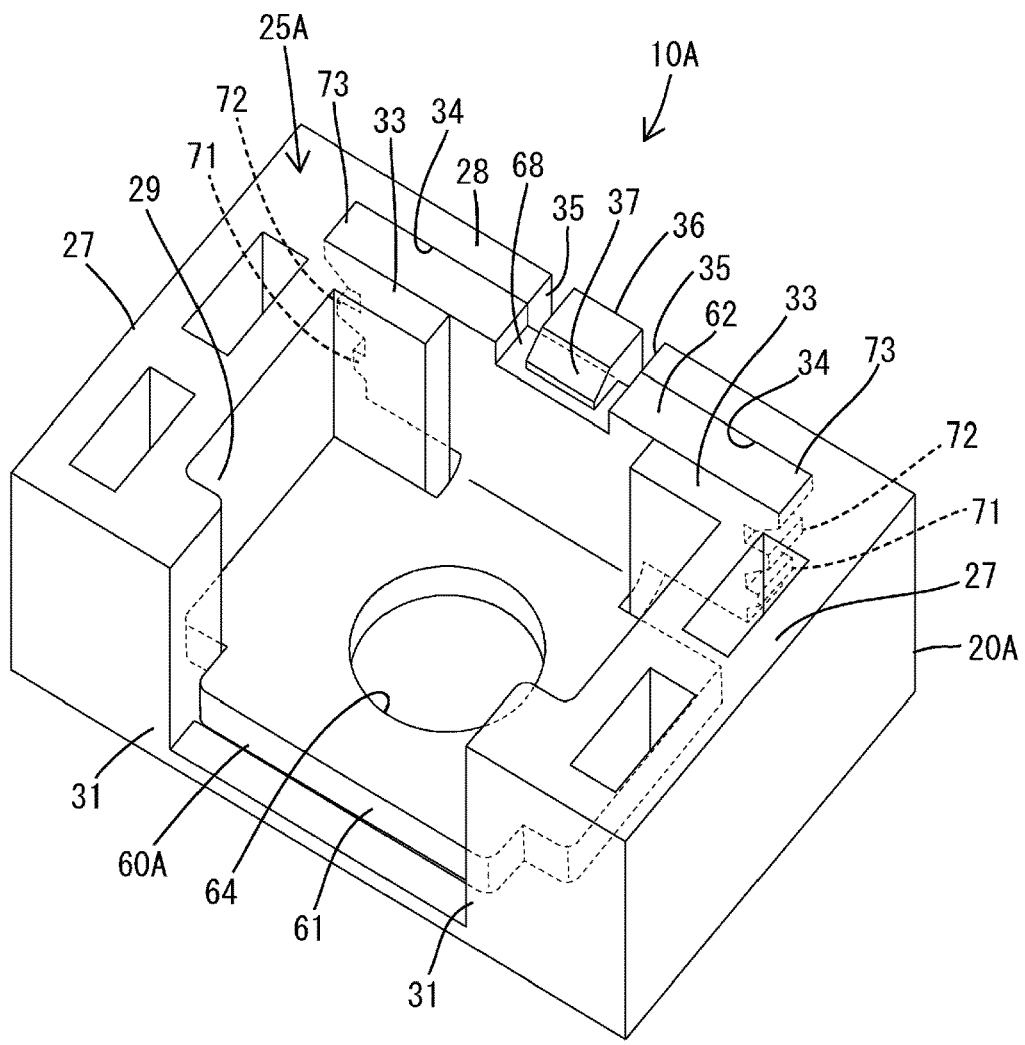
FIG. 7 is a view of a support member of a second embodiment of the present disclosure, corresponding to FIG. 2.

The plate 60 is a metal plate that is punched by press processing, then bent processed into its shape, and pressed fitted and fixed from above in the press fitting space 30 of the receptacle portion 25. As shown in FIGS. 3 and 6, the plate 60 is composed of a fixing portion 61 and a press fit portion 62 that bends and extends from the fixing portion 61, and they together form the shape of the letter 'L' overall. The plate 60 is fixed to the receptacle portion 25, the fixing portion 61 is positioned along the planar direction of the support surface 23 of the bottom wall 21, and the press fit portion 62 is positioned along the wall face portion of the back wall 28.

The lower portion of the press fit portion 62 is provided with an approximately rectangular through-hole 63 that extends to the connecting portion of the fixing portion 61. The connecting portion that connects the press fit portion 62 and the fixing portion 61 has a reduced strength due to the through-hole 63, and has a structure capable of being easily bent.

Figure 4:
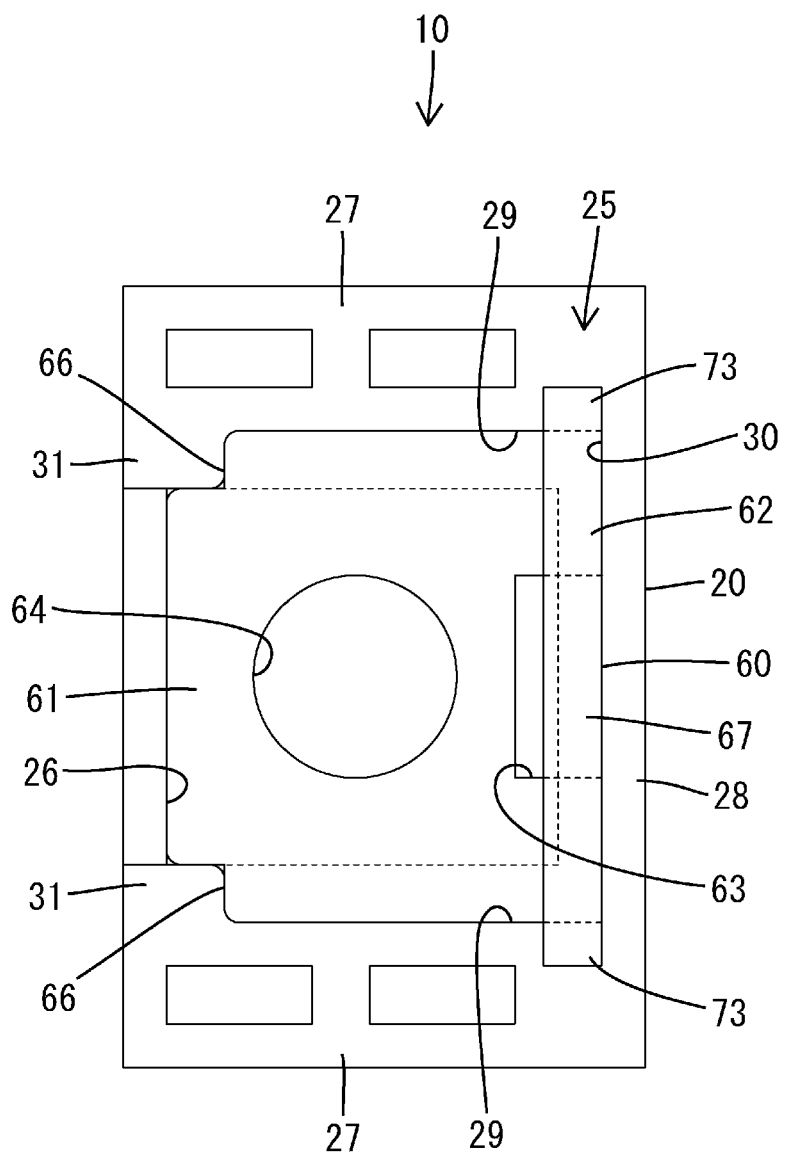
FIG. 4 is a plan view of FIG. 2.

The center of the fixing portion 61 has a circular through-hole 64 into which a bolt 80 can be inserted. The upper surface of the fixing portion 61 is a flat bearing surface 65 that acts as a mount for a head portion 81 of the bolt 80. The two corners to the left and right of the leading end of the fixing portion 61 have recessed portions 66 in the form of notches with an L-shaped cross-section. As shown in FIG. 4, in a state in which the plate 60 is fixed to the receptacle portion 25, the recessed portions 66 become fitted to the corner portions of the end walls 31, and the fixing portion 61 of the plate 60, which will be discussed later, is sandwiched between the end walls 31 and the back wall 28.

The press fit portion 62 has a base portion 67 that has a width dimension that is the same as the distance between the two side walls 27, and has a plurality of protrusions 71, 72, and 73, which are arranged at intervals in the vertical direction on the right and left side edges of the base portion 67. As shown in FIG. 6, as for each protrusion 71, 72, and 73, the bottom end is positioned in a tapered upward incline facing the tip, the upper end is positioned extending substantially along the left-right direction, and the top end is positioned extending substantially along the vertical direction.

Specifically, the plurality of protrusions include a pair of first protrusions 71 on the left and right which are positioned at the bottom, a pair of third protrusions 73 on the left and right which are positioned at the top, and a pair of second protrusions 72 on the left and right which are positioned between the first protrusions 71 and the third protrusions 72. The first protrusions 71 are positioned in the foremost position in the direction of press fitting the plate 60 into the receptacle portion 25. The third protrusions 73 are positioned in the rearmost position in the direction of press fitting the plate 60 into the receptacle portion 25, and the upper ends are continuous in the left-right direction with the upper end of the base portion 67.

The first protrusions 71 have, in comparison to the second protrusions 72 and the third protrusions 73, a smaller dimension of protrusion laterally from the side edges of the base portion 67. Conversely, the third protrusions 73 have, in comparison to the second protrusions 72 and the first protrusions 71, a larger dimension of protrusion laterally from the side edges of the base portion 67. For these reasons, the dimension of protrusion laterally from the side edges of base portion 67 successively increases in order of the first protrusion 71, the second protrusion 72, and the third protrusion 73 from the front side of the press fitting direction of the plate 60 to the rear side of the press fitting direction. The first protrusions 71 resemble the shape of the second protrusions 72 with the leading end portion removed, and the vertical dimension of the leading ends is larger than the vertical dimension of the leading ends of the second protrusions 72.

A first groove portion 74 is defined by the side edge of the base portion 67, the first protrusion 71, and the second protrusion 72, and a second groove portion 75 is defined by the side edge of the base portion 67, the second protrusion 72, and the third protrusion 73. Due to the dimensions of protrusion increasing in size in the order of the first protrusions 71, the second protrusions 72, and the third protrusions 73, the first groove portion 74 is deeper on the second protrusion 72 side than on the first protrusion 71 side, and the second groove portion 75 is deeper on the third protrusion 73 side than on the second protrusion 72 side.

Next is a description of the operational procedure of attaching the support member 10 to the hydraulic control device 90.

First, the plate 60 is lowered into the receptacle portion 25 from above the main body portion 20, and is press fitted in the press fitting space 30 of the receptacle portion 25. In the press fitting process of the plate 60, the base portion 67 of the press fit portion 62 slides along the wall surface portions of the back wall 28, and the protrusions 71, 72, and 73 advance so as to dig into the wall surfaces 29 of the two side walls 27. When this happens, the first protrusions 71, the second protrusions 72, and the third protrusions 73 begin to dig into the wall surfaces 29 in the stated order.

Shavings are produced when the first protrusions 71 dig into and scrape against wall surfaces 29, the produced shavings move into the first grooves 74, and the shavings are effectively caught by the portions of the first groove portions 74 on the second protrusion 72 side that have a larger protruding dimension than the first protrusions 71. Similarly, even if shavings are produced from the second protrusions 72 scraping against the wall surfaces 29, those shavings are effectively caught by the portions of the second groove portions 75 on the third protrusion 73 side that have a larger protruding dimension than the second protrusions 72. The third protrusions 73 are positioned at the upper end portion of the press fit portion 62, and therefore the area of the wall surfaces 29 that can be scraped by the third protrusions 73 is small, and the shavings that are produced are promptly removed.

When the plate 60 is correctly press fitted into the receptacle portion 25, the fixing portion 61 is positioned on the mounting surface 32, the through-hole 64 comes into communication with the opening 26, the recessions 66 fit into the end walls 31, and the protrusions 71, 72, and 73 dig into the wall surfaces 29 and are fixed. Thus, the plate 60 is held in a state of being prevented from being withdrawn from the main body portion 20. Note that the upper ends of the third protrusions 73 are positioned as to be exposed to the upper surface of receptacle portion 25.

Figure 5:
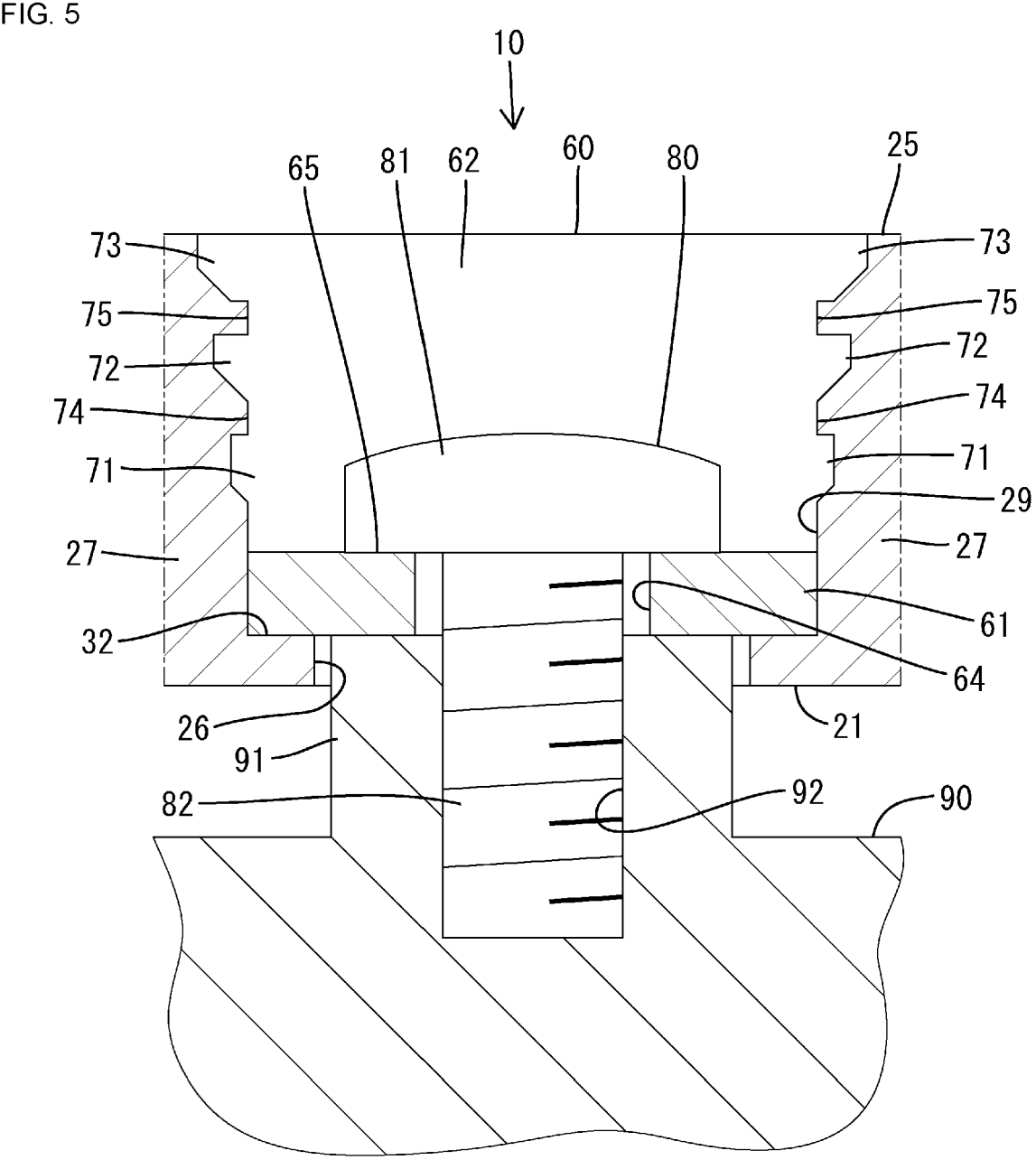
FIG. 5 is a cross-sectional view of a portion in which the support member is fixed to a device via a bolt, viewed from the front.

Next, the support member 10 is attached to the hydraulic control device 90. As shown in FIG. 5, a boss portion 91 protrudes from the body portion of the hydraulic control device 90, and the fixing portion 61 of the plate 60 is mounted to the upper end surface of the boss portion 91 via the opening 26. A screw hole 92 is formed as an opening in the upper end surface of the boss portion 91, and when the fixing portion 61 is mounted on the upper end surface of the boss portion 91, the through-hole 64 of the fixing portion 61 is positioned so as to be in communication with the screw hole 92.

Next, a shaft portion 82 of the bolt 80 is screwed into the screw hole 92 through the through-hole 64 in the fixing portion 61. The head portion 81 of the bolt 80 abuts the seat 65 of the fixing portion 61, and the fixing portion 61 is sandwiched between the boss portion 91 and the head portion 81 of the bolt 80. Thus, the plate 60 becomes fixed to the hydraulic control device 90, and the main body portion 20 is attached to the hydraulic control device 90 via the plate 60. Note that the bolt 80 mentioned here is a general concept that includes screw members such as machine screws that are fastened with a screw driver.

As described above, according to the first embodiment, the metal plate 60 is press fitted and fixed to the receptacle portion 25 of the resin main body portion 20 without insert molding, and moreover, because the plate 60 can be formed easily through press processing, it is possible to reduce manufacturing costs.

Also, likewise to the case of placing electric wires 50 on the support surface 23 of the main body portion 20, the plate 60 is press fitted into the receptacle portion 25 by being lowered from above, which is the direction that intersects the planar direction of the support surface 23. For this reason, it is possible to smoothly perform the operation of press fitting the plate 60.

Also, because the receptacle portion 25 has the opening 26 that is in communication with the through-hole 64 and allows the fixing portion 61 to face the hydraulic control device 90, it is possible to quickly attach the plate 60 to the hydraulic control device 90 via the bolt 80 being inserted into through-hole 64 of the fixing portion 61.

Furthermore, because the plurality of protrusions 71, 72, and 73 are configured so that the protrusions successively increase in size from the front in the press fitting direction to the rear in the press fitting direction, even if shavings are produced from the protrusions at the front in the press fitting direction (first protrusions 71, second protrusions 72) scraping against the wall surfaces 29 of the receptacle portion 25, the produced shavings are effectively caught in the first groove portions 74 and second groove portions 75 that are formed between the respective protrusions 71 and 72 and the protrusions that are adjacent thereto rearward in the press fitting direction (the second protrusion 72 adjacent to the first protrusion 71, and the third protrusion 73 adjacent to the second protrusion 72). As a result, it is possible to avoid a situation in which shavings mix with a fluid such as hydraulic fluid that exists inside the hydraulic control device 90.

Second Embodiment

FIGS. 7 to 10 show a second embodiment of the present disclosure. In a support member 10A of the second embodiment, the configuration of a receptacle portion 25A is different from the first embodiment. However, the basic configuration of the receptacle portion 25A is the same as the receptacle portion 25 of the first embodiment. For this reason, in the following, the description will focus on the portions that are added to the receptacle portion 25 of the first embodiment, and uses the same numbers as the first embodiment for portions that are the same or equivalent.

Figure 8:
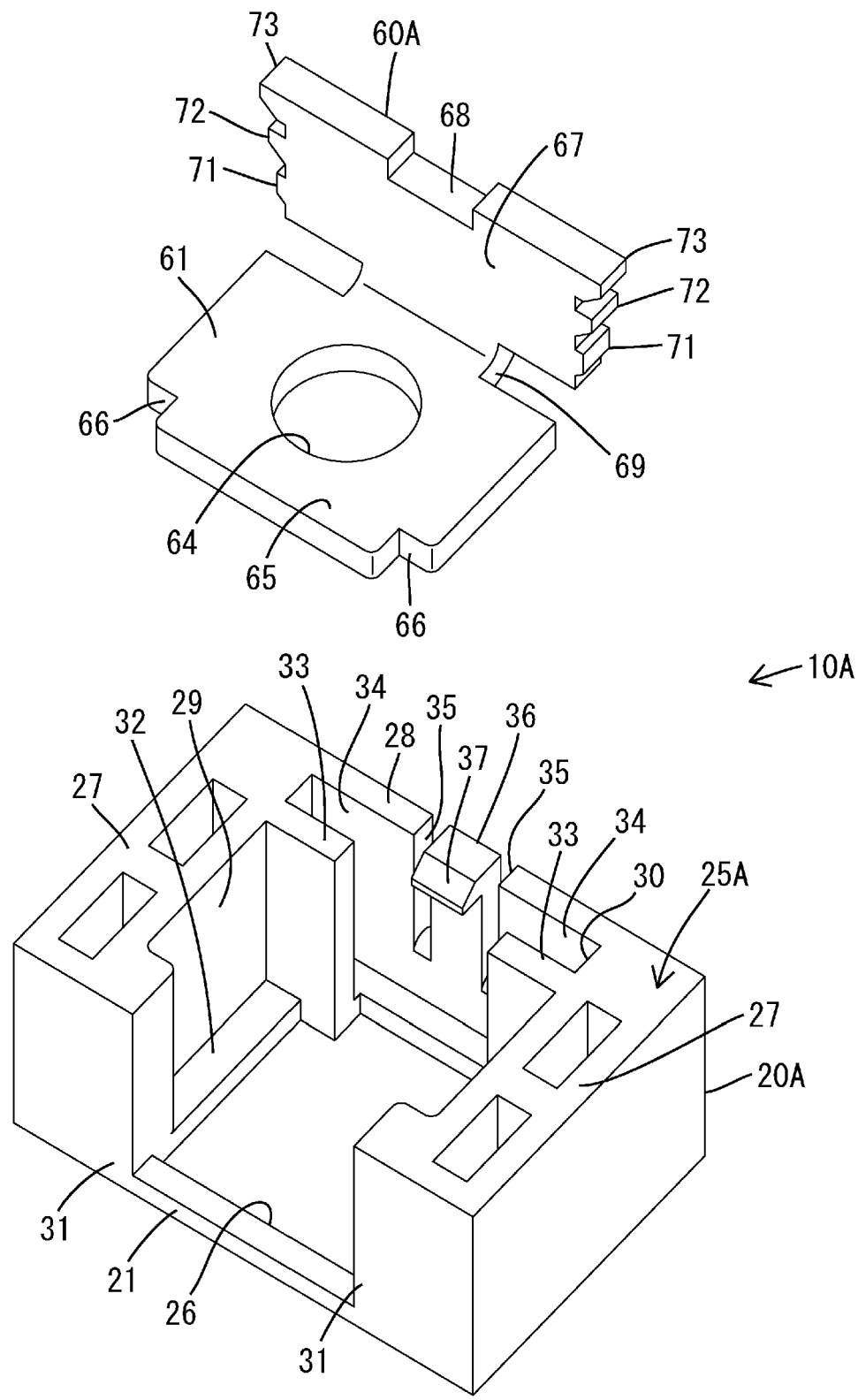
FIG. 8 is a view corresponding to FIG. 3.
Figure 9:
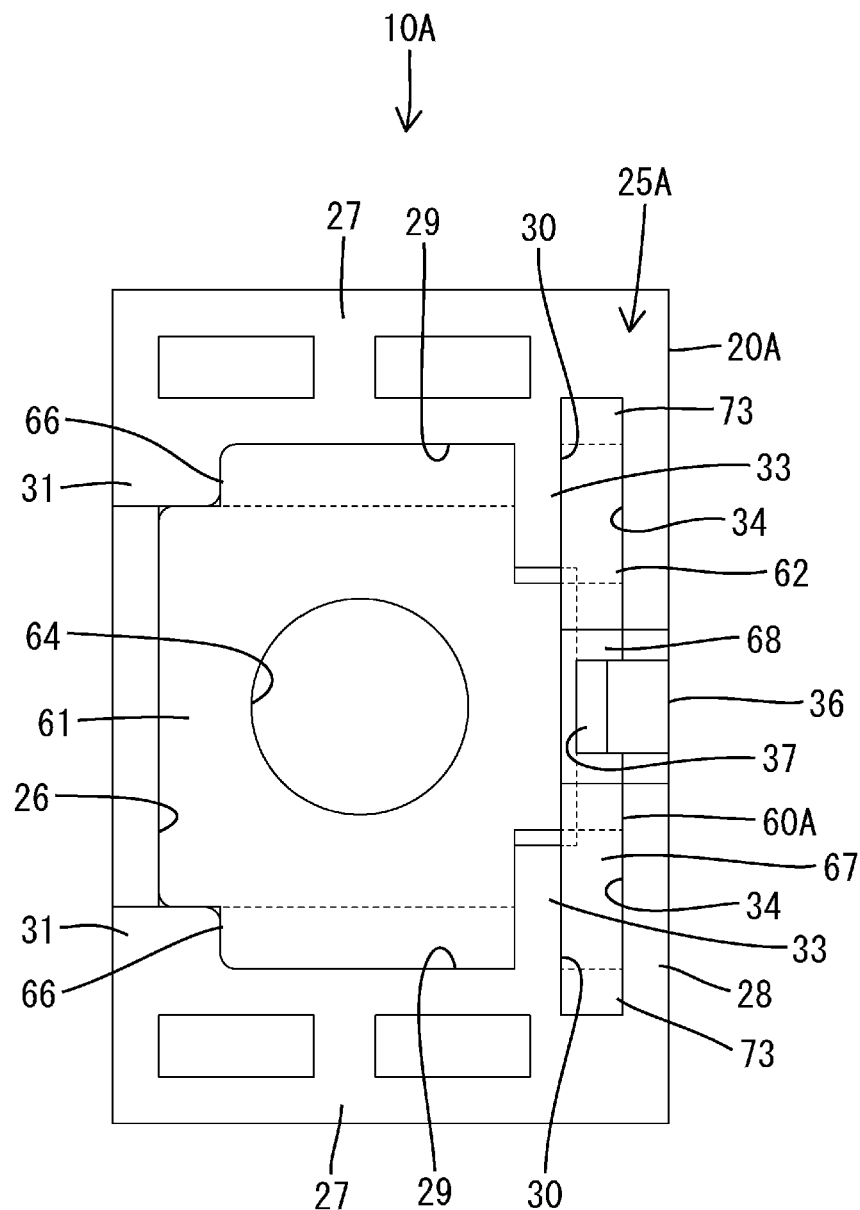
FIG. 9 is a view corresponding to FIG. 4.
Figure 10:
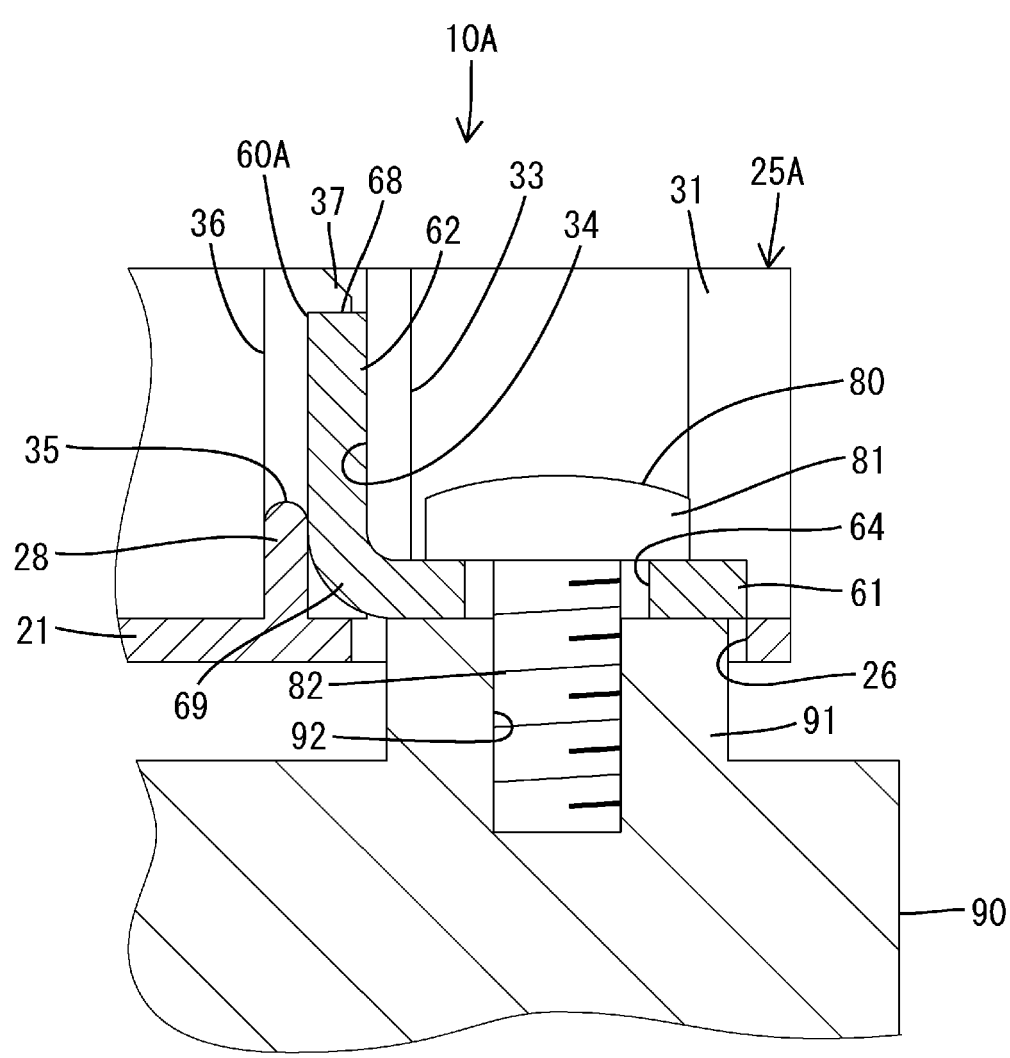
FIG. 10 is a cross-sectional view of a portion in which the support member is fixed to a device via a bolt, viewed from the side.

The receptacle portion 25A, as shown in FIGS. 8 and 9, has a pair of sealing walls 33 that protrude in a direction of approaching each other from positions toward the back wall 28 on the wall surfaces 29 of the two side walls 27. The sealing walls 33 are positioned opposing the back wall 28 across a space from the back wall 33 that is approximately the same as the plate thickness of the press fit portion 62. Also, the sealing walls 33 have a flat plate shape that is continuous over the entire height of the two side walls 27. Here, the sealing walls 33 and the back wall 28 constitute enclosing portions 34 that define flattened groove-shaped press fitting spaces 30 with the wall surfaces 29 of the side walls 27 on the deep side.

Also, the receptacle portion 25A has an elastic lock portion 36 that stands vertically between two slits 35 that are a pair of slits 35 that are open at the upper end and extend in the vertical direction in the center in the left-right direction of the back wall 28. The elastic locking portion 36 is able to deform by bending in the plate thickness direction of the back wall 28 with the lower end acting as a fulcrum. The upper end portion of the elastic lock portion 36 is equipped with a locking protrusion portion 37 that is in the shape of a claw and protrudes toward the side of the press fitting spaces 30. The upper surface of the locking protrusion portion 37 has a tapered portion that slopes downward toward the leading end, while the lower surface is positioned substantially horizontally in the protruding direction.

As shown in FIG. 8, a plate 60A has a recession-shaped notch portion 68 that is lockable to the locking protrusion portion 37, in the central portion in the left-right direction of the upper end edge of the base portion 67. Also, the plate 60A has a constricted portion 69 that is constricted in the width direction in the connecting portion between the press fitting portion 62 and the fixing portion 61, and does not have the through-hole 63 of the first embodiment.

During assembly, similarly to the first embodiment, the plate 60A is press fitted from above into the receptacle portion 25A of the main body portion 20A. In the press fitting process of the plate 60A, when the base portion 67 of the press fitting portion 62 is slid along the wall surface portion of the back wall 28, the base portion 67 slides in contact with the tapered portion of the upper surface of the locking protrusion 37, and the elastic locking portion 36 deforms and bends in the direction away from the press fitting spaces 30. When the plate 60A is correctly press fitted into the receptacle portion 25A, the elastic lock portion 36 undergoes elastic restoration, and the locking protrusion 37 is positioned so that it is possible to abut the bottom surface of the notch portion 68 (see FIG. 7).

Also, when the plate 60A is correctly press fitted into the receptacle portion 25A, as each of the protrusions 71, 72, and 73 advance so as to dig into the wall surfaces 29 of the two side walls 27, the two left and right end portions of the base portion 67 are inserted into the press fitting spaces 30 of the enclosing portions 34 and abut the back wall 28 and the sealing walls 33. Thus, the left and right end portions of the press fit portion 62 are substantially enclosed within the enclosing portions 34. Also, the sealing walls 33 are positioned so as to be fitted into constricted portions by the constricted portion 69. Then, similarly to the first embodiment, the fixing portion 61 of the plate 60 is mounted to the upper end surface of the boss portion 91 via the opening 26, and in this state, the shaft portion 82 of the bolt 80 is screwed into the screw hole 92, and the support member 10A is attached to the hydraulic control device 90 (see FIG. 10).

In the case of the second embodiment, even if the protrusions 71, 72, and 73 create shavings from scraping against the wall surfaces 29 of the side walls 27, similarly to the first embodiment, the shavings are effectively caught by the second groove portions 75 and the first groove portions 74. Moreover, because the shavings can be caught within the enclosing portions 34, discharge to the outside is prevented in a dual manner. As a result, it is possible to avoid, with a high reliability, a state in which shavings mix with a fluid such as hydraulic fluid that exists inside hydraulic control device 90.

Also, due to the elastic lock portion 36 elastically holding down and locking the press fit portion 62, the stability of the press fitted state of the plate 60A can be maintained. Even if the press fitting force of the plate 60A degrades over time, due to the locking effect of the elastic lock portion 36, it is possible to prevent the plate 60A from being withdrawn from the receptacle portion 25A.

OTHER EMBODIMENTS

The following briefly describes other embodiments of the present disclosure.

The support surface of the main body portion may support, as a conductive member, objects other than electrical wires, such as bus bars.

(2) The openings may be open at the outer peripheral edge of the bottom wall of the receptacle portion.

(3) The main body portion may be in block form.

(4) A metal washer may be placed between the plate and the head portion of the bolt. Also, a nut may be mounted to the seat of the fixing portion.

(5) Two or more elastic locking portions may be provided in the receptacle portion.

(6) The receptacle portion may have a front wall at a position that faces the back wall, and may surround the four sides.

(7) The present disclosure is not limited to a hydraulic control device, and is widely applicable to devices to which a support member for supporting a conductive member is to be attached.

The invention claimed is:

1. A support member comprising:
a main body portion that is made of a resin and has a support surface that supports a conductive member; and
a plate that is made of a metal, has a through-hole, and is to be attached to a device,
wherein the main body portion has a receptacle portion into which the plate is press fitted and fixed.

2. The support member according to claim 1,
wherein the plate has a protrusion on a side end portion, and
the receptacle portion has a wall surface extending along a direction that intersects a planar direction of the support surface, and has a configuration in which a side end portion of the plate is positioned along the wall surface, and the protrusion digs into and is locked to the wall surface.

3. The support member according to claim 2, wherein the plate has a plurality of protrusions on a side end portion arranged side-by-side in a press fitting direction with respect to the receptacle portion, the receptacle portion has a wall surface that the protrusions dig into and are locked to, and the plurality of protrusions are configured to protrude a larger amount successively from a protrusion forward in the press fitting direction to a protrusion rearward in the press fitting direction.

4. The support member according to claim 2, wherein the plate has a protrusion on a side end portion, and the receptacle portion has a wall surface that the protrusion digs into and is locked to, and has an enclosing portion that covers the side end portion of the plate with the wall surface positioned on a deep side.

5. The support member according to claim 2, wherein the main body portion has an elastic locking portion having elasticity that restricts withdrawal of the plate from the receptacle portion.

6. The support member according to claim 2,
wherein the plate has a press fit portion that has the protrusion, and a fixing portion that has the through-hole and bends from and is continuous with the press fit portion, and
the receptacle portion has an opening that comes into communication with the through-hole and allows the fixing portion to face the device.

7. The support member according to claim 6, wherein the plate has a plurality of protrusions on a side end portion arranged side-by-side in a press fitting direction with respect to the receptacle portion, the receptacle portion has a wall surface that the protrusions dig into and are locked to, and the plurality of protrusions are configured to protrude a larger amount successively from a protrusion forward in the press fitting direction to a protrusion rearward in the press fitting direction.

8. The support member according to claim 6, wherein the plate has a protrusion on a side end portion, and the receptacle portion has a wall surface that the protrusion digs into and is locked to, and has an enclosing portion that covers the side end portion of the plate with the wall surface positioned on a deep side.

9. The support member according to claim 6, wherein the main body portion has an elastic locking portion having elasticity that restricts withdrawal of the plate from the receptacle portion.

10. The support member according to claim 1,
wherein the plate has a plurality of protrusions on a side end portion arranged side-by-side in a press fitting direction with respect to the receptacle portion,
the receptacle portion has a wall surface that the protrusions dig into and are locked to, and
the plurality of protrusions are configured to protrude a larger amount successively from a protrusion forward in the press fitting direction to a protrusion rearward in the press fitting direction.

11. The support member according to claim 10, wherein the plate has a protrusion on a side end portion, and the receptacle portion has a wall surface that the protrusion digs into and is locked to, and has an enclosing portion that covers the side end portion of the plate with the wall surface positioned on a deep side.

12. The support member according to claim 10, wherein the main body portion has an elastic locking portion having elasticity that restricts withdrawal of the plate from the receptacle portion.

13. The support member according to claim 1,
wherein the plate has a protrusion on a side end portion, and
the receptacle portion has a wall surface that the protrusion digs into and is locked to, and has an enclosing portion that covers the side end portion of the plate with the wall surface positioned on a deep side.

14. The support member according to claim 13, wherein the main body portion has an elastic locking portion having elasticity that restricts withdrawal of the plate from the receptacle portion.

15. The support member according to claim 1, wherein the main body portion has an elastic locking portion having elasticity that restricts withdrawal of the plate from the receptacle portion.

* * * * *